United States Patent
Kim et al.

(10) Patent No.: US 10,011,936 B2
(45) Date of Patent: Jul. 3, 2018

(54) LAUNDRY PROCESSING MACHINE

(71) Applicants: Keunjoo Kim, Seoul (KR); Seungchul Park, Seoul (KR)

(72) Inventors: Keunjoo Kim, Seoul (KR); Seungchul Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1282 days.

(21) Appl. No.: 13/953,606

(22) Filed: Jul. 29, 2013

(65) Prior Publication Data

US 2014/0026623 A1    Jan. 30, 2014

(30) Foreign Application Priority Data

Jul. 30, 2012  (KR) .................. 10-2012-0083383
Jul. 30, 2012  (KR) .................. 10-2012-0083384

(51) Int. Cl.
*D06F 37/22*   (2006.01)
*D06F 37/20*   (2006.01)
*F16F 7/09*    (2006.01)

(52) U.S. Cl.
CPC .............. *D06F 37/22* (2013.01); *D06F 37/20* (2013.01); *F16F 7/09* (2013.01)

(58) Field of Classification Search
CPC .......... D06F 37/20; D06F 37/22; D06F 37/24; F16F 7/082; F16F 7/085; F16F 7/09; F16F 7/095
USPC ........................................................ 68/23.1
See application file for complete search history.

(56) References Cited

U.S. PATENT DOCUMENTS

| | | | | |
|---|---|---|---|---|
| 3,191,454 A * | 6/1965 | Holzer | ..................... | D06F 37/36 310/209 |
| 3,598,460 A * | 8/1971 | Conrath | ................... | D06F 37/24 118/77 |
| 2004/0148976 A1* | 8/2004 | Kim | ........................ | D06F 37/20 68/23.1 |
| 2004/0261469 A1* | 12/2004 | Park | ........................ | D06F 37/22 68/23 R |
| 2006/0010935 A1* | 1/2006 | Park | ........................ | D06F 37/20 68/3 R |
| 2006/0011429 A1 | 1/2006 | Park et al. | | |
| 2010/0154130 A1* | 6/2010 | Han | ....................... | D06F 37/203 8/158 |
| 2011/0113832 A1 | 5/2011 | Ackermann et al. | | |
| 2011/0259688 A1* | 10/2011 | Kanioz | ................... | D06F 37/20 188/381 |

FOREIGN PATENT DOCUMENTS

| EP | 0555707 A1 | 8/1993 | |
|---|---|---|---|
| EP | EP 1243686 A1 * | 9/2002 | ............. D06F 37/20 |
| EP | 2090687 A1 | 8/2009 | |
| JP | 2006-029585 A | 2/2006 | |

(Continued)

*Primary Examiner* — Marc Lorenzi
(74) *Attorney, Agent, or Firm* — Dentons US LLP

(57) ABSTRACT

A laundry processing machine including a casing, an outer tub supported in the casing, an inner tub rotatably provided in the outer tub, and a shock absorber. The shock absorber is coupled, at one end thereof, to the casing and coupled, at the other end thereof, to the outer tub to absorb vibration of the outer tub caused by rotation of the inner tub. The shock absorber actively provides a damping force in response to the vibration of the outer tub.

30 Claims, 14 Drawing Sheets

(56) References Cited

FOREIGN PATENT DOCUMENTS

| KR | 10-2006-0005579 A | 1/2006 |
| KR | 1020110015777 A | 2/2011 |
| WO | 2011141770 A1 | 11/2011 |

\* cited by examiner (a)   (b)

LAUNDRY PROCESSING MACHINE

CROSS-REFERENCE TO RELATED APPLICATIONS

This application claims the priority benefit of Korean Patent Applications Nos. 10-2012-0083383 and 10-2012-0083384, both filed Jul. 30, 2012 in the Korean Intellectual Property Office, the disclosure of which is incorporated herein by reference.

BACKGROUND

1. Field

The present disclosure relates to a laundry processing machine.

2. Description of the Related Art

A laundry processing machine includes an outer tub arranged in and supported by a fixing body such as a casing or a body, and an inner tub arranged in the outer tub to accommodate laundry and rotate. The laundry processing machine performs the operations of washing, rinsing and drying.

The laundry processing machine is generally provided with a suspension to attenuate vibration of the outer tub caused by rotation of the inner tub. The suspension absorbs vibrational energy to dampen the vibrations. However, conventional suspensions simply absorb vibrational energy, but fail to respond differently according to different characteristics of vibration. For example, during operation of the laundry processing machine, when the rotation of the inner tub is in a transient state before reaching a steady state, larger vibrations occur than in the steady state. Accordingly, a means to produce shock absorption force or vibration damping force is needed in this state. However, in the steady state, it is preferable to allow the outer tub to naturally vibrate to maintain the steady state rather than to change the stabilized vibration system.

Conventionally, suspensions have been designed to attenuate vibrations in a vibration section in which the outer tub severely vibrates, e.g., the transient vibration section, but not in consideration of vibration in the steady state. Particularly, with the conventional suspension, most of the vibration of the outer tub in the steady state is transferred to surrounding components such as the cabinet. As a result, the floor on which the laundry processing machine is installed vibrates and excessive noise is produced due to vibration of the laundry processing machine.

SUMMARY

Therefore, the present disclosure has been made in view of the above problems, and it is an object of the present invention to provide a laundry processing machine which is capable of actively controlling a damping force in response to the amount of vibration of the outer tub.

In accordance with one aspect of the present invention, the above and other objects can be accomplished by a laundry processing machine including a casing, an outer tub supported in the casing, an inner tub rotatably provided in the outer tub, and a shock absorber coupled, at one end thereof, to the casing and coupled, at the other end thereof, to the outer tub to absorb vibration of the outer tub caused by rotation of the inner tub, the shock absorber actively provides a damping force in response to the vibration of the outer tub.

The shock absorber may include a cylinder connected to one of the casing and the outer tub, a piston connected to the other one of the casing and the outer tub, wherein the cylinder and the piston move relative to each other according to movement of the outer tub, a slide member arranged to slide along the piston, and a slide member guide interposed between the cylinder and the slide member to rotate between a first rotational position and a second rotational position, and adapted to have a larger displacement with respect to the slide member at the first rotational position than at the second rotational position, when moving according to the vibration of the outer tub.

Alternatively, the shock absorber may include a cylinder connected to one of the casing and the outer tub, a piston connected to the other one of the casing and the outer tub, wherein the cylinder and the piston move relative to each other according to movement of the outer tub, a friction member provided to generate friction with the piston, a friction member holder to integrally move together with the friction member, and a holder operating member to apply pressure to the friction member holder to cause the friction member to contact the piston when the holder operating member is at a first operational position and to release the pressure applied to the friction member holder to allow the friction member to be separated from the piston when the holder operating member is at a second operational position.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
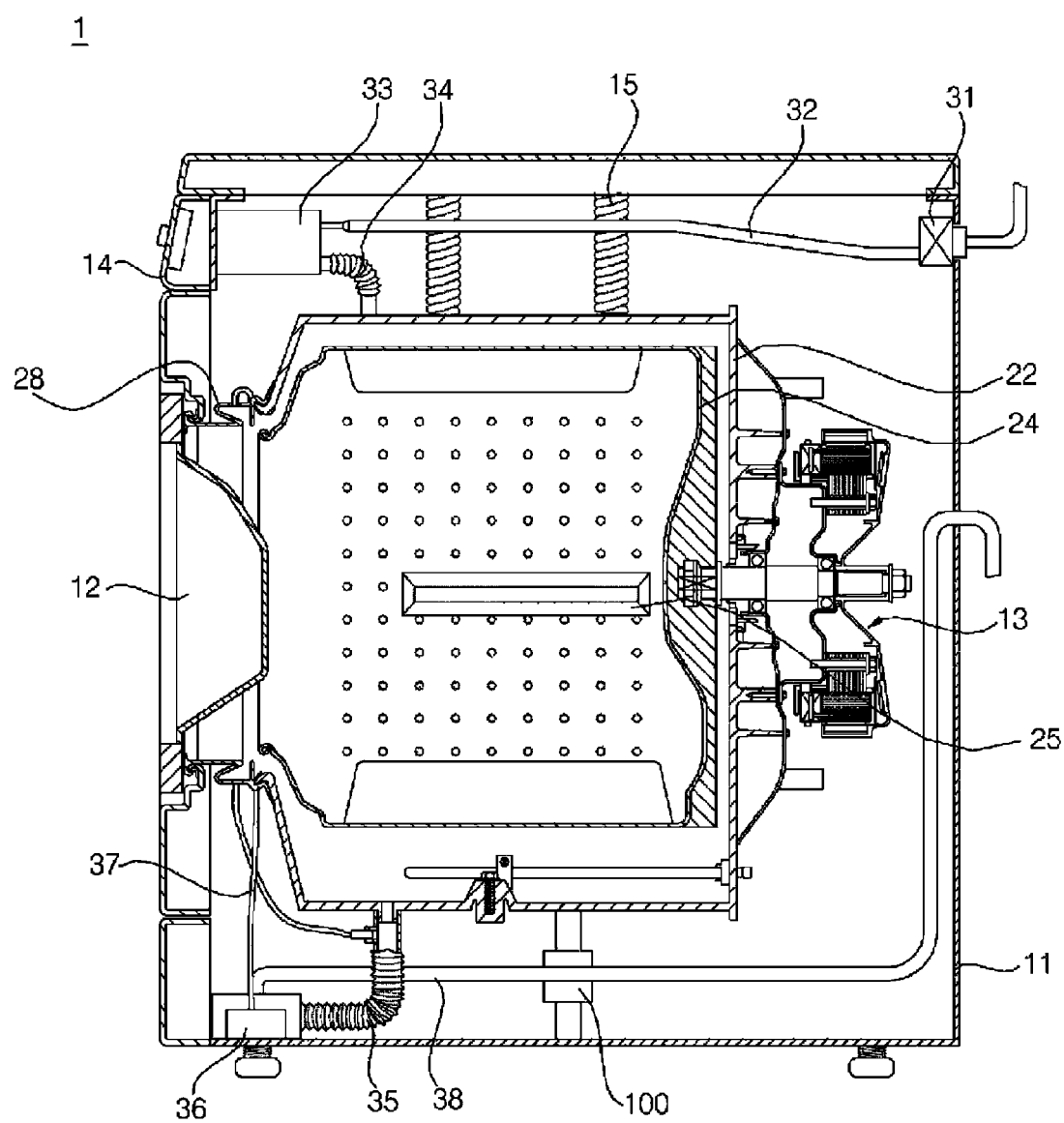
FIG. 1 is a cross-sectional view showing a laundry processing machine according to an exemplary embodiment of the present invention.

FIG. 1 is a cross-sectional view showing a laundry processing machine 1 according to an exemplary embodiment of the present invention. Referring to FIG. 1, laundry processing machine 1 includes a casing 11 forming an external appearance of laundry processing machine 1 and provided with a laundry opening allowing insertion or retrieval of laundry, a door 12 rotatably installed at casing 11 to open and close the laundry opening, an outer tub 22 disposed in casing 11, an inner tub 24 rotatably arranged in outer tub 22 to accommodate laundry therein, a driving unit 13 to provide driving force for rotation of inner tub 24, a detergent box (not shown) to accommodate detergent to be introduced into outer tub 22, and a control panel 14 provided with input keys to receive various input control commands from a user and a display to display the operational state of laundry processing machine 1.

Outer tub 22 is supported by a shock absorber 100 inside of casing 11. Shock absorber 100 is a device to absorb vibrational energy. Examples of shock absorber 100 include a spring which is elastically deformed according to vibration of a vibrating body and returned to original state when the vibration is removed, and a damper which produces a predetermined resistance or damping force against periodic vibration of a vibrating body to hasten disipation of the periodic vibration. Shock absorber 100 may actively provide damping force in response to vibration of outer tub 22.

In laundry processing machine 1 of this embodiment, shock may be absorbed not only by shock absorber 100, but also by a spring 15. Spring 15 is deformable according to the displacement of the upper end of outer tub 22. Broadly, spring 15 is a type of shock absorber. However, the term 'spring' is employed to distinguish spring 15 from shock absorber 100.

Inner tub 24 is rotated by driving unit 13. Inner tub 24 is provided with a plurality of through holes to allow washing water to flow between inner tub 24 and outer tub 22. The inner wall of inner tub 24 may be provided with a plurality of lifters 25 to lift the laundry to a certain height when inner tub 24 rotates.

Inner tub 24 may indirectly transfer driving force produced by driving unit 13 to inner tub 24 via a power transmission means such as a belt or a pulley. In this embodiment, however, a direct drive is adopted in which the driving shaft of driving unit 13 is coaxially aligned with the center of rotation of inner tub 24, and a rotor of driving unit 13 and inner tub 24 integrally rotate. In the direct drive configuration, driving unit 13 may include a motor capable of controlling the rotational speed of inner tub 24 as well as rotating inner tub 24 in the forward/rearward directions.

Gasket 28 seals the gap between outer tub 22 and casing 11. Gasket 28 is disposed between an opening at the front outer tub 22 and the laundry opening of casing 11. Gasket 28 is formed of an elastically deformable material. Gasket 28 relieves shock transferred to door 12 by being folded during rotation of inner tub 24 while also preventing the washing water in outer tub 22 from leaking outward. Gasket 28 may be provided with a nozzle (not shown) to spray washing water into inner tub 24.

Additionally, laundry processing machine 1 may include a water supply valve 31 to regulate inflow of washing water from an external water source, and a water supply channel 32 through which washing water introduced via water supply valve 31 flows.

The detergent box accommodates an additive for washing such as a detergent, a fabric softener, or a bleaching agent. The detergent box may be arranged at the front of casing 11 so as to be retractable from casing 11. A housing may be provided in casing 11 to accommodate the detergent box. The washing water supplied through water supply channel 32 is mixed with the detergent while passing through the detergent box in housing 33 and then supplied into outer tub 22 via a water supply bellows 34.

Laundry processing machine 1 may further include a drainage bellows 35 to discharge washing water from outer tub 22, a pump 36 to forcibly transport the washing water along drainage bellows 35, and a drainage channel 38 to guide discharge of the washing water forcibly transported by pump 36 to the outside. In some embodiments, the washing water in outer tub 22 may be forcibly transported to the nozzle by operation of pump 36. For example, a circulation channel 37 may be provided to connect pump 36 to the nozzle.

Figure 2:
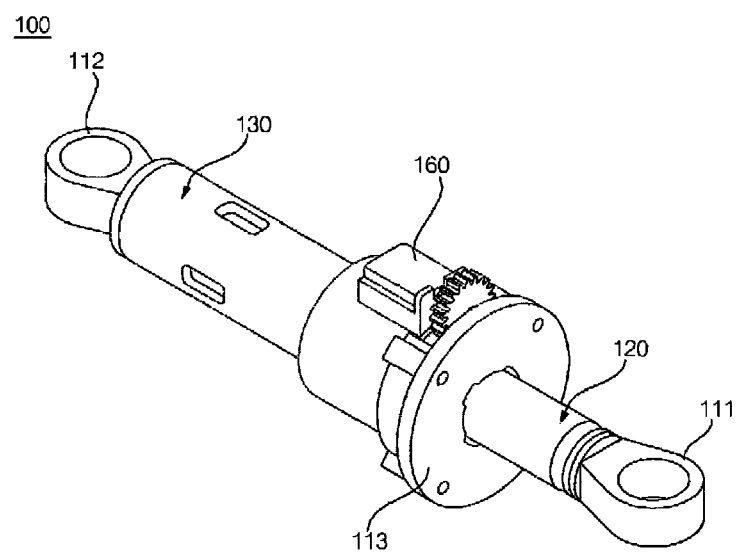
FIG. 2 is a perspective view showing a shock absorber shown in FIG. 1.
Figure 3:
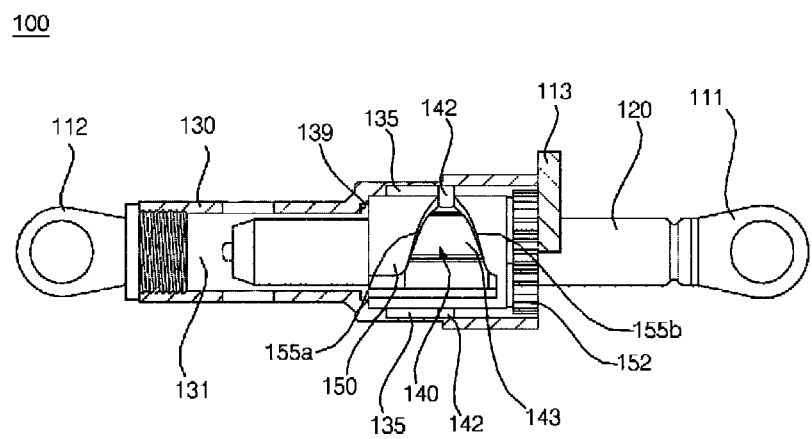
FIG. 3 is a cutaway view showing the inner part of the shock absorber of FIG. 2.
Figure 4:
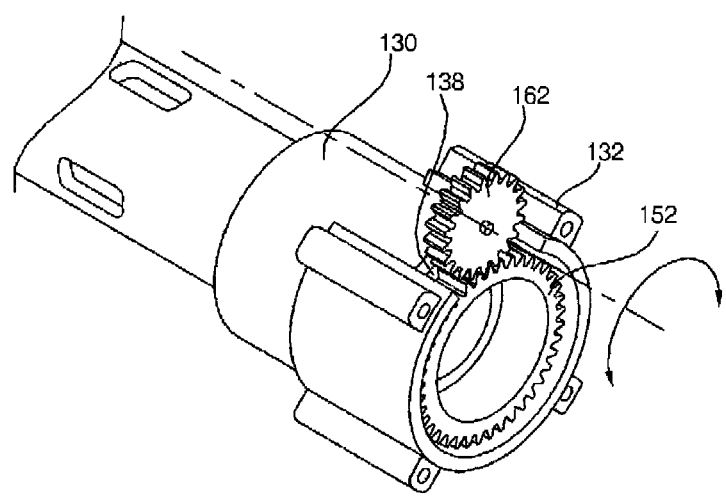
FIG. 4 is an enlarged view showing a portion of the shock absorber of FIG. 2.
Figure 5A:
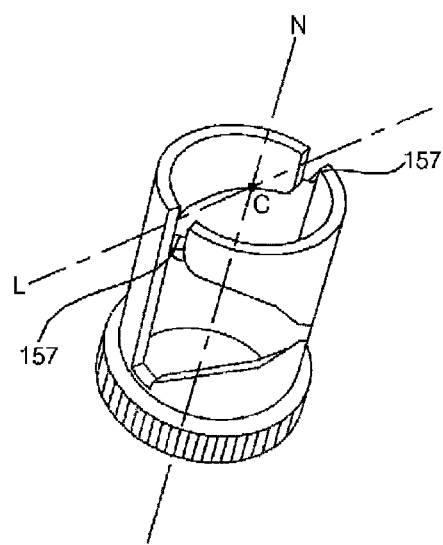
FIG. 5A is a perspective view showing a slide member guide.
Figure 5B:
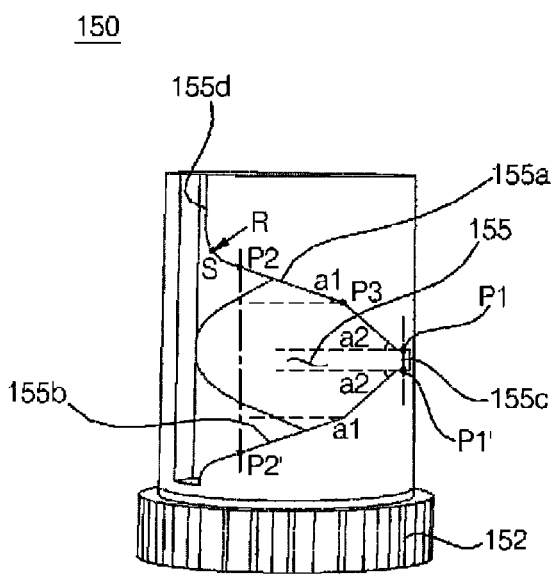
FIG. 5B is a front view showing the slide member guide of FIG. 5A.
Figure 6:
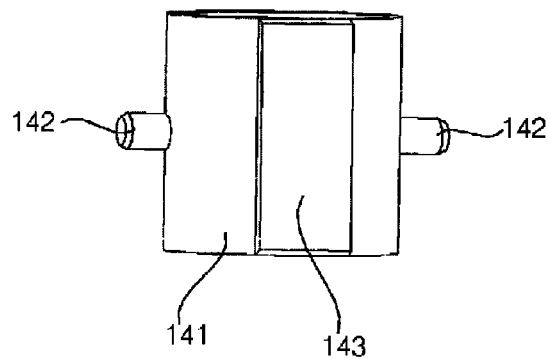
FIG. 6 is a front view showing a slide member.
Figure 7:
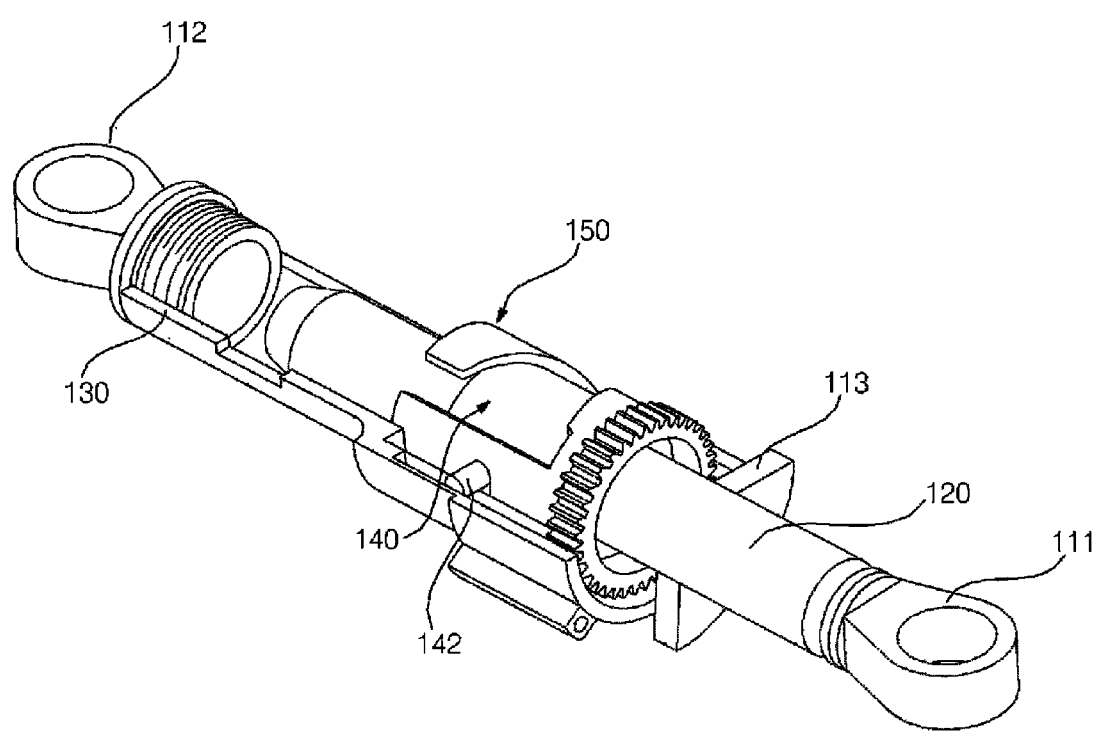
FIG. 7 is a cutaway view showing the shock absorber, with the slide member guide placed at a first rotational position.
Figure 8:
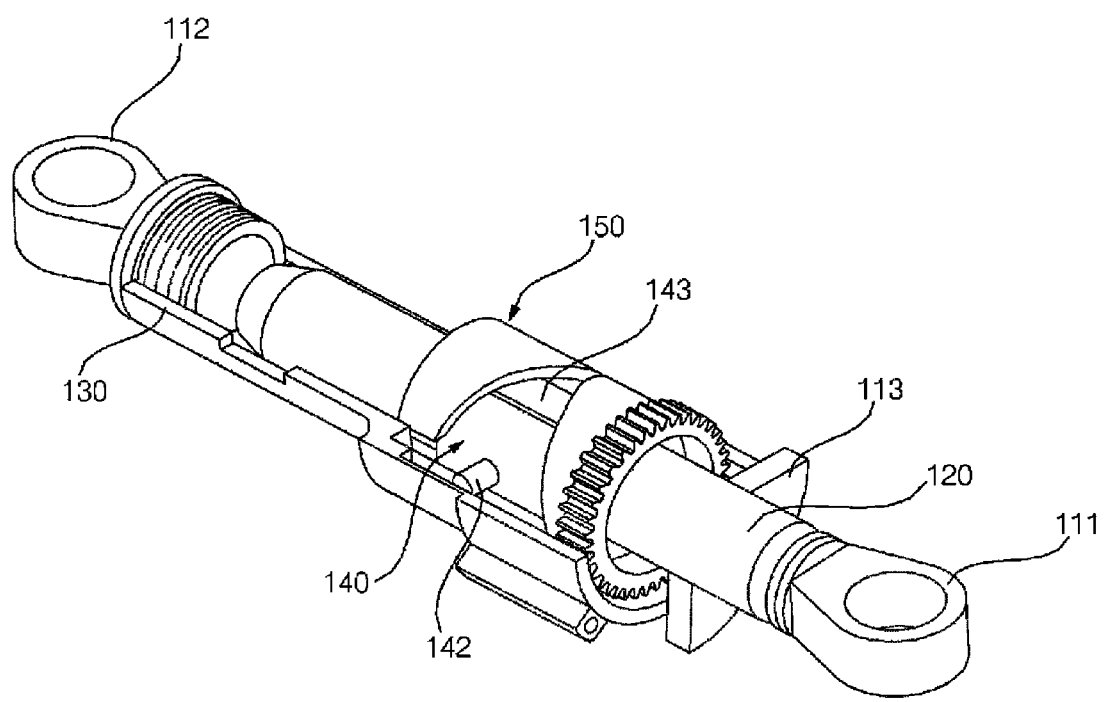
FIG. 8 is a cutaway view showing the shock absorber, with the slide member guide placed at a second rotational position.

FIG. 2 is a perspective view showing a shock absorber shown in FIG. 1. FIG. 3 is a cutaway view showing the inner part of the shock absorber of FIG. 2. FIG. 4 is an enlarged view showing a portion of the shock absorber of FIG. 2. FIG. 5A is a perspective view showing a slide member guide. FIG. 5B is a front view showing the slide member guide of FIG. 5A. FIG. 6 is a front view showing a slide member. FIG. 7 is a cutaway view showing the shock absorber, with the slide member guide placed at a first rotational position. FIG. 8 is a cutaway view showing the shock absorber, with the slide member guide placed at a second rotational position.

Referring to FIGS. 2 to 8, shock absorber 100 includes a piston 120, a cylinder 130, a slide member 140, and a slide member guide 150.

Piston 120 is connected to one of casing 11 and outer tub 22 and is inserted into cylinder 130. Cylinder 130 is connected to the other one of casing 11 and outer tub 22. When outer tub 22 vibrates, piston 120 and cylinder 130 make relative movements with respect to each other. That is, when outer tub 22 vibrates, piston 120 and cylinder 130 have displacements with respect to each other. In one embodiment, cylinder 130 is connected to outer tub 22 and is moved according to vibration of outer tub 22. In another embodiment, piston 120 is connected to casing 11 and fixed. Shock absorber 100 may be provided with a piston connection portion 111 to connect piston 120 to casing 11, and a cylinder connection portion 112 to connect cylinder 130 to outer tub 22.

Figure 9:
FIG. 9 is a block diagram illustrating control relationship between components that operate a shock absorber according to one embodiment.

Shock absorber 100 may further include a shock absorption control motor 173 (see FIG. 9). Shock absorption control motor 173 provides driving force to rotate slide member guide 150, which will be described later. For example, shock absorption control motor 173 may include a direct current (DC) motor which produces torque between about 300 g·cm and 2,500 g·cm. Driving force from shock absorption control motor 173 may be transferred to slide member guide 150 by at least one driving gear 162, which will be described later. A driven gear 152 to engage with a driving gear 162 may be formed at slide member guide 150. In one embodiment, driven gear 152 is a spur gear having a plurality of gear teeth arranged along the outer circumferential surface of slide member guide 150. Embodiments of the invention are not limited thereto. Driven gear 152 may be realized in various shapes so long as it can receive power from driving gear 162.

Slide member guide 150 is interposed between cylinder 130 and slide member 140, and is driven by shock absorption control motor 173 to rotate between the first rotational position (see FIG. 7) and a second rotational position (see FIG. 8). When slide member guide 150 moves according to vibration of outer tub 22, slide member guide 150 has a larger displacement at the second rotational position with respect to slide member 140 than at the first rotational position. Herein, the displacement is defined with reference to the relative position of slide member guide 150 with respect to slide member 140. Slide member guide 150 may be formed of polytetrafluoroethylene.

Slide member 140 is formed with a hollow shape to allow piston 120 to be inserted therein. Thereby, friction occurs between the inner circumferential surface of slide member 140 forming the hollow part and the outer circumferential surface of piston 120.

Slide member 140 may include a protrusion 142 protruding from an outer circumferential surface 141 of slide member 140 (see FIG. 6). A pair of protrusions 142 may be provided at the opposite positions. A movement groove 135 may be formed inside cylinder 130. Protrusions 142 move within movement groove 135. Movement groove 135 extends in the longitudinal direction along cylinder 130 to allow protrusions 142 to move within a certain range when slide member 140 moves in response to vibration of outer tub 22. A pair of movement grooves 135 may be provided on both sides of cylinder 130 to correspond to the number of protrusions 142.

Movement groove 135 may be formed to have a width corresponding to that of protrusion 142. Accordingly, protrusions 142 are allowed to move in the longitudinal direction of movement groove 135 within a certain range, but circumferential movement of protrusions 142, i.e., rotational movement of slide member 140 about piston 120 is restricted.

Referring to FIGS. 5A and 5B, slide member guide 150 includes an open-cut portion 155 formed to surround the outer side of slide member 140 and to allow protrusions 142 to be disposed therethrough. Movement of protrusions 142 according to movement of slide member 140 mainly occurs in a space limited by open-cut portion 155.

Open-cut portion 155 extends in the circumferential direction of slide member guide 150. Open-cut portion 155 includes a first boundary 155a and a second boundary 155b arranged on both sides of protrusion 142. First boundary 155a moves protrusion 142 in one direction (e.g., downward) according to vibration of outer tub 22, and second boundary 155b moves protrusion 142 in the opposite direction (e.g., upward). The distance between first boundary 155a and second boundary 155b may vary along the circumferential direction of slide member guide 150. When the amount of vibration of outer tub 22 is small, the displacement of slide member guide 150 is also small. Therefore, collision between protrusion 142 and first boundary 155a or second boundary 155b may not occur. In such cases, only slide member guide 150 needs to move, with slide member 140 fixed. To accomplish this, the friction between slide member guide 150 and slide member 140 is preferably smaller than the friction between slide member 140 and piston 120.

Meanwhile, slide member 140 is moved by slide member guide 150 which moves together with cylinder 130 according to vibration of outer tub 22. Depending on the distance between first boundary 155a and second boundary 155b contacting protrusion 142 at each rotational position, the maximum allowed value of relative displacement of slide member guide 150 with respect to protrusion 142 is determined.

Hereinafter, the relative displacement of protrusion 142 is defined with reference to the relative position of protrusion 142 (or slide member 140) with respect to slide member guide 150 when a relative displacement is produced between the slide member 140 and slide member guide 150 according to vibration of outer tub 22. By this definition, the relative displacement of protrusion 142 allowed at the second rotational position is greater than the relative displacement allowed at the first rotational position. When protrusion 142 is restricted by slide member guide 150 at the first rotational position, the relative displacement of slide member guide 150 with respect to protrusion 142 is 0.

When slide member guide 150 reciprocates according to vibration of outer tub 22, the distance between a point P2 at which protrusion 142 and first boundary 155a meet at the second rotational position and a point P2' at which protrusion 142 and second boundary 155b meet at the second rotational position is greater than the distance between point P1 at which protrusion 142 and first boundary 155a meet at the first rotational position and point P1' at which protrusion 142 and second boundary 155b meet at the first rotational position. In one embodiment, movement of protrusion 142 is restricted by a restriction groove 155c at the first rotational position. The first rotational position is not limited thereto. Any rotational position can be taken as the first rotational position so long as the maximum allowable relative displacement of slide member guide 150 with respect to slide member 140 is smaller than the maximum allowable relative displacement at the second rotational position. The maximum allowable relative displacement substantially includes the value 0.

Open-cut portion 155 may be provided with a protrusion insert path 157 to allow protrusion 142 to be inserted into or removed from protrusion insert path 157 when slide member 140 and slide member guide 150 are coupled or decoupled. Both sides of protrusion insert path 157 are spaced a predetermined distance from each other to allow protrusion 142 to be inserted therein. One of the sides, i.e., insert path boundary 155d extends from first boundary 155a.

Meanwhile, first boundary 155a or second boundary 155b may include adjoining sections having different slopes. The sections extending from protrusion insert path 157 to restriction groove 155c along first boundary 155a may include a transition point P3 therebetween at which the slope changes. The slope may change from a first slope a1 to the second slope a2 at transition point P3 (a1<a2). When protrusion 142 is displaced from restriction groove 155*c*, if the rotational position changes from the first rotational position to the second rotational position, protrusion 142 does not directly enter the section with the first slope a1, but protrusion 142 passes a section with the second slope a2, in which the amount of displacement of protrusion 142 is smaller than in the section with the slope a1. Therefore, the amount of displacement of protrusion 142 may be restricted within a proper range at the initial stage of change in rotational position such that the displacement of protrusion 142 does not abruptly increase, and accordingly, shock produced by collision between protrusion 142 and open-cut portion 155 may be relieved and accompanying noise may be reduced.

Insert path boundary 155*d* and first boundary 155*a* both form the boundary of open-cut portion 155, and need to be distinguished from each other. Insert path boundary 155*d* and first boundary 155*a* may be defined as follows. That is, during vibration of outer tub 22, when slide member guide 150 is gradually rotated such that slide member guide 150 moves from the first rotational position to the second rotational position, the displacement of protrusion 142 is limited within first boundary 155*a* and second boundary 155*b*, within a certain range of angle of rotation. However, when slide member guide 150 continues to rotate, collision between protrusion 142 and first boundary 155*a* eventually stops. First boundary 155*a* and insert path boundary 155*d* may be divided by this time. If the displacement of slide member 140 is not restricted when protrusion 142 positioned on protrusion insert path 157 is pushed upward by second boundary 155*b*, protrusion 142 may be derailed through protrusion insert path 157 during subsequent descent of slide member guide 150. To prevent this event from occurring, cylinder 130 may be provided with a structure to collide with the upper end of slide member 140 to restrict movement of protrusion 142 in protrusion insert path 157. In this case, one section of first boundary 155*a* corresponding to the section in which the displacement of protrusion 142 is restricted by collision between cylinder 130 and slide member 140 may be defined as insert path boundary 155*d*. In consideration of collision with protrusion 142, it is preferable that the slope continuously changes from insert path boundary 155*d* to first boundary 155*a* (i.e., this distance is rounded). FIG. 5B illustrates formation of a section having a radius of curvature R between insert path boundary 155*d* and first boundary 155*a*.

Referring to FIG. 4, shock absorber 100 may include at least one gear to transfer driving force of shock absorption control motor 173 to allow rotation of slide member 140. The at least one gear may include a driving gear 162 rotated by shock absorption control motor 173, and a driven gear 152 formed along the outer circumferential surface of slide member guide 150 to rotate in response to rotation of driving gear 162. The gear ratio between driving gear 162 and driven gear 152 may be 2:1. This means that driven gear 152 completes one rotation when driving gear 162 completes two rotations. In one embodiment, driving gear 162 rotates at the same rotational speed (rpm) as that of shock absorption control motor 173, and driven gear 152 rotates at the same rotational speed (rpm) as that of slide member guide 150. In other embodiments, however, a power transmission means such as a gear may be provided between driving gear 162 and driven gear 152.

Cylinder 130 may be provided with a gear exposure opening 138 such that driven gear 152 formed at slide member guide 150 is exposed outside of cylinder 130. In this case, a portion of driven gear 152 exposed to the outside through gear exposure opening 138 engages with driving gear 162.

One end of cylinder 130 needs to be open wide enough to allow slide member 140 and slide member guide 150 to be easily inserted into cylinder 130. After slide member 140 is installed in cylinder 130, a cylinder cap 113 may be coupled to the one end of cylinder 130. An insert hole is formed at the center of cylinder cap 113 to allow insertion of piston 120. FIGS. 7 and 8 show cylinder 130, in which a part of cylinder cap 113 is cut away such that other components in cylinder 130 are clearly visible. Piston 120 may be provided with a fastening portion 132 allowing a fastening member such as a screw, a bolt, or a pin to be inserted thereinto to be coupled to cylinder cap 113. The fastening member may penetrate fastening portion 132 to be fastened to cylinder cap 113.

Referring to FIGS. 5A, 5B, and 6, a pair of protrusions 142 may be symmetrically formed on slide member guide 150, and two open-cut portions 155 corresponding to protrusions 142 may be formed on slide member guide 150. Open-cut portions 155 are symmetrically disposed with respect to the center C (see FIG. 5A) positioned on the axial line of rotation N of slide member guide 150. Particularly, the inlets of protrusion insert path 157 may be disposed on the straight line L passing the center C.

Slide member 140 may include a frictional contact surface 143 partially protruding along outer circumferential surface 141 to maintain contact with the inner circumferential surface of slide member guide 150. Accordingly, friction between slide member 140 and slide member guide 150 is caused only by frictional contact surface 143. This structure allows slide member 140 to be stably supported in slide member guide 150 without shaking and limits friction occurring between slide member 140 and slide member guide 150 to below a certain level. Accordingly, the slide member guide 150 is at the second rotational position, slide member 140 can move relatively freely in slide member guide 150. Frictional contact surface 143 may be formed on both sides of the outer circumferential surface of slide member 140, and preferably be symmetrically disposed such that slide member 140 is stably supported.

In particular, first boundary 155*a* and second boundary 155*b* are preferably positioned on frictional contact surface 143 at any rotational position of slide member guide 150. In this case, the length of frictional contact surface 143 is greater than the distance between first boundary 155*a* and second boundary 155*b*, and therefore frictional contact surface 143 and slide member guide 150 can be kept in contact with each other.

FIG. 7 is a cutaway view showing the shock absorber, with the slide member guide placed at a first rotational position. FIG. 8 is a cutaway view showing the shock absorber, with the slide member guide placed at a second rotational position. Hereinafter, operation of shock absorber 100 according to vibration of outer tub 22 will be described with reference to FIGS. 7 and 8.

In one embodiment of the invention, the rotational position of slide member guide 150 can be controlled according to the amount of vibration of outer tub 22. With respect to the control of vibration of an object which exhibits periodic movement, it is widely known that the vibrational energy of the object needs to be absorbed by damping the vibration in a vibration range within which the amount of vibration is large, and a degree of freedom of the object to keep the steady state is preferably secured when the movement of the object reaches the steady state and the amount of vibration is within an allowed range. The first rotational position is a position at which rotation of slide member guide 150 is controlled to damp the vibration of outer tub 22 in the case that vibration of outer tub 22 increases to a large extent. At the first rotational position, protrusion 142 may be inserted into restriction groove 155*c*. In this case, slide member guide 150 and slide member 140 are integrally moved, and the vibration is damped by the friction between slide member 140 and piston 120.

On the other hand, the second rotational position is a position at which rotation of slide member guide 150 is controlled such that slide member guide 150 can be freely moved compared to the movement of slide member guide 150 at the first rotational position. In the case that vibration of outer tub 22 is very low as in the steady state, slide member 140 is fixed and slide member guide 150 is allowed to move. At the second rotational position, slide member 140 may be moved by slide member guide 150 depending on the amount of vibration of outer tub 22. In this case, due to the distance between first boundary 155*a* and second boundary 155*b* (for example, the distance between P2 and P2' in FIG. 6), reciprocation of slide member guide 150 may be performed without interference with protrusion 142 in the majority of the corresponding section.

FIG. 9 is a block diagram illustrating a control relationship between components that operate a shock absorber according to one embodiment. Referring to FIG. 9, in a vibration section in which the level of vibration of outer tub 22 becomes equal to or higher than a certain level during rotation of inner tub 24, slide member guide 150 is controlled to move to the first rotational position such that the vibration is absorbed by friction acting between slide member 140 and piston 120. On the other hand, in the case that the level of vibration of outer tub 22 is less than a certain level, slide member guide 150 is controlled to move to the second rotational position to allow slide member guide 150 to move relatively freely. At this time, the rotational positions of slide member guide 150 may be switched though control of shock absorption control motor 173 by a controller 172.

During switching of slide member guide 150 between the first rotational position and the second rotational position, slide member guide 150 moves together with cylinder 130 according to the vibration of outer tub 22. Thereby, slide member 140 also moves together. At this time, downward movement of slide member 140 is formed by first boundary 155*a*, and upward movement of slide member 140 is formed by second boundary 155*b*.

In some embodiments, a vibration sensing unit (not shown) to measure the amount of vibration of outer tub 22 may be further provided. For example, the vibration sensing unit may be realized as an output sensor to sense change in output power of driving unit 13 according to rotation of inner tub 24, or as a displacement sensor to measure displacement of outer tub 22 according to vibration. Additionally, in some embodiments, a speed detection unit 171 to detect change in rotational speed of inner tub 24 may be further provided. Controller 172 controls operation of shock absorption control motor 173 according to the rotational speed detected by speed detection unit 171 to control rotation of slide member guide 150.

Laundry processing machine 1 generally exhibits a certain pattern of vibration, which is somewhat predictable, according to the rotational speed of inner tub 24. For example, resonance is produced in outer tub 22 in a specific range of rotational speed depending on the natural frequency of outer tub 22. When such a range is defined as a resonant speed section, laundry distribution operation or maldistribution removing operation of rotating inner tub 24 in a certain pattern is performed in a predetermined range of rotational speed away from the resonant speed section to distribute the laundry accommodated in inner tub 24 or to remove maldistribution of the laundry in inner tub 24. When distribution of the laundry in inner tub 24 becomes uniform to a certain extent through such operation, the rotational speed of inner tub 24 is increased to perform the drying operation. In one embodiment, the rotational positions of slide member guide 150 are controlled, with reference to a preset speed (about 400 rpm) equal to or higher than the resonant speed. That is, in the range of rotational speed of inner tub 24, which is lower than the preset speed, slide member guide 150 is controlled to move to the first rotational position to damp the vibration. In the range of rotational speed of inner tub 24 higher than the preset speed, slide member guide 150 is controlled to move to the second rotational position to secure a movement section wide enough for slide member guide 150 to move without interfering with protrusion 142 (that is, the maximum distance that protrusion 142 can move in the open-cut portion, at the second rotational position).

Particularly, slide member guide 150 may selectively switch to the first rotational position or the second rotational position according to the rotational speed of inner tub 24. In some embodiments, slide member guide 150 may be controlled such that slide member guide 150 has various rotational positions between the first rotational position and the second rotational position.

In addition, in controlling of slide member guide 150 to move to the second rotational position in the section of steady state rotation of inner tub 22, if the displacement of slide member guide 150 according to the amount of vibration of outer tub 22 is less than the distance between first boundary 155*a* and second boundary 155*b*, for example, the distance between P2 and P2' in FIG. 5B at the same rotational position, collision between open-cut portion 155 and protrusion 142 does not occur. Thereby, slide member guide 150 can freely move without interfering with protrusion 142 within a predetermined rotational displacement.

Figure 10:
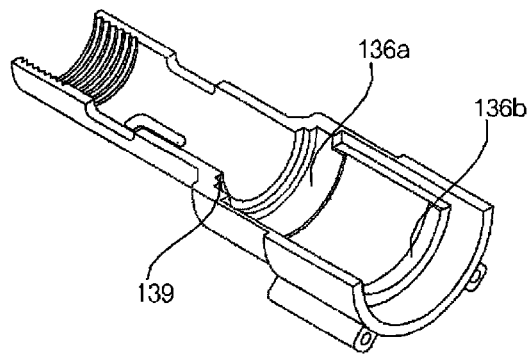
FIG. 10 is a cutaway view showing a cylinder.

FIG. 10 is a cutaway view showing cylinder 130. Referring to FIG. 10, slide member guide 150 may be supported by contacting the inner circumferential surface of cylinder 130. Cylinder 130 may include at least one support surface partially protruding from the inner circumferential surface of cylinder 130. The support surface may include a first support surface 136*a* and a second support surface 136*b*, which respectively contact both longitudinal ends of slide member guide 150. The outer circumferential surface of slide member guide 150 does not entirely contact the inner circumferential surface of cylinder 130, but partially contacts the inner circumferential surface of cylinder 130 on the at least one support surface. Accordingly, friction may be reduced and switching between the rotational positions of slide member guide 150 may be smoothly performed.

Meanwhile, a restriction surface 139 (see FIGS. 3 and 11) may be formed in cylinder 130. While the protrusion of slide member 140 moves in protrusion insert path 157 of slide member guide 150, it hits the upper end of slide member 140. Thereby, the maximum allowable displacement of slide member 140 is limited. Particularly, restriction surface 139 contacts the longitudinal end of the slide member 140 before protrusion 142 contacts the longitudinal end of movement groove 135. Thereby, movement of protrusion 142 may be restricted. Since protrusion 142 does not collide with the longitudinal end of movement groove 135, damage can be prevented.

Figure 11:
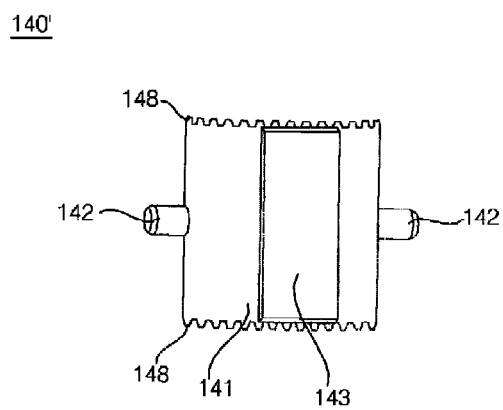
FIG. 11 is a view showing another embodiment of the slide member.

FIG. 11 is a view showing another embodiment of the slide member. Referring to FIG. 11, depressions 148 may be formed at a portion of the upper end of slide member 140' which collide with restriction surface 139 formed on cylinder 130. Compared to the case in which the upper end of slide member 140' has an even surface, the surface with the depressions may reduce the area of the surface to collide with restriction surface 139. Thereby, noise due to shock can be reduced.

Figure 12:
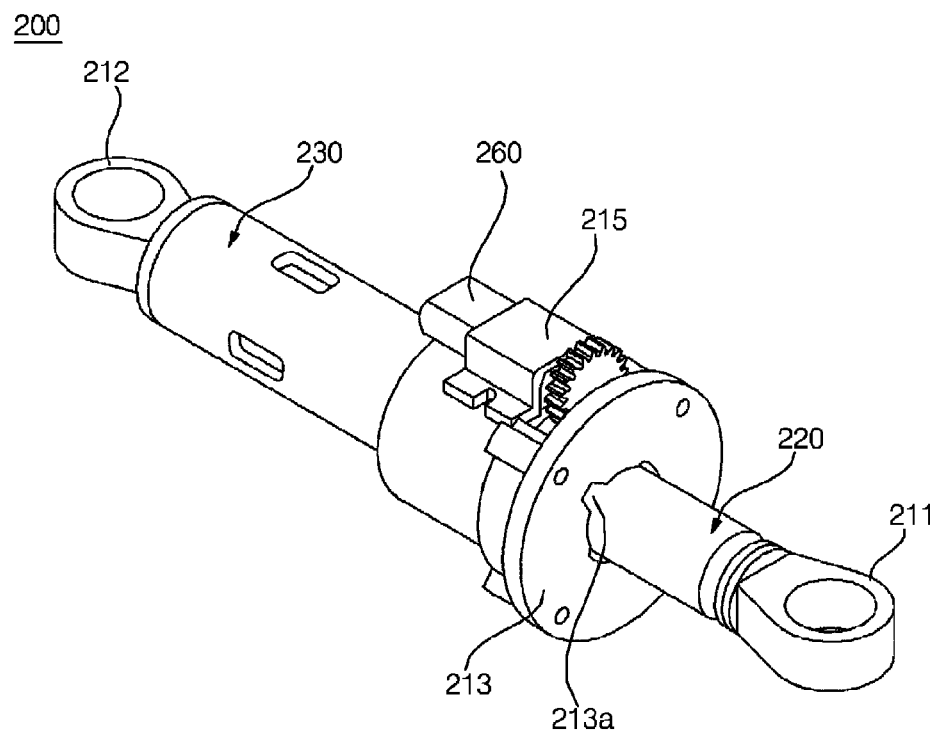
FIG. 12 is a perspective view showing a shock absorber according to another embodiment.
Figure 13:
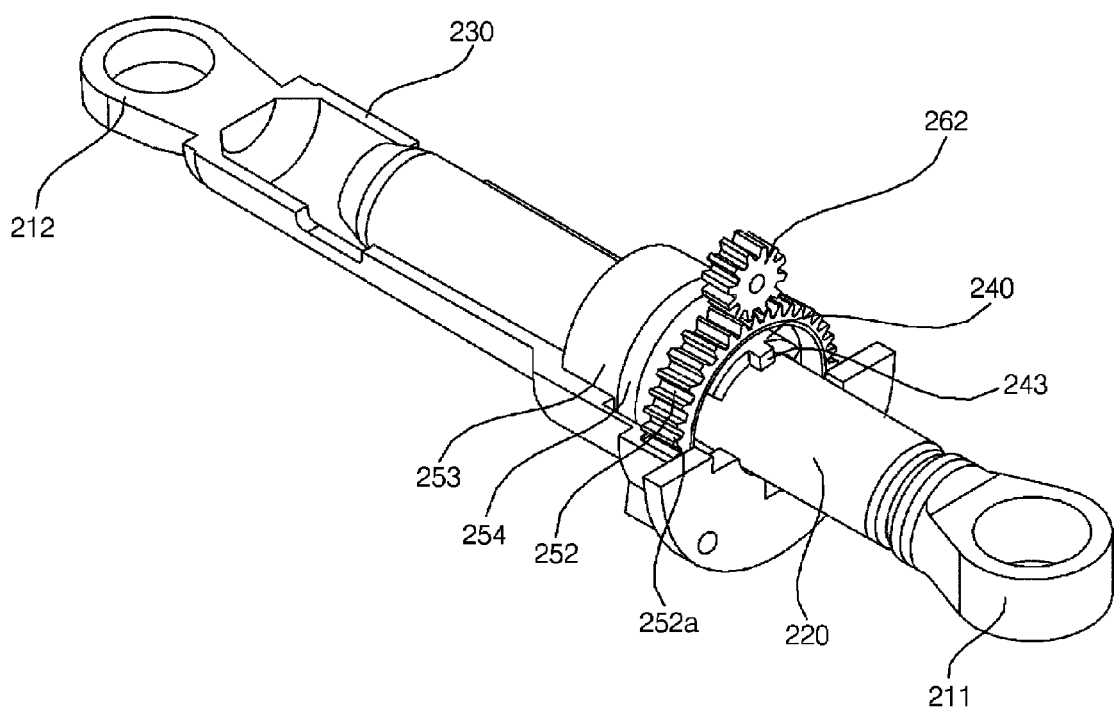
FIG. 13 is a cutaway view showing the shock absorber of FIG. 12.
Figure 14:
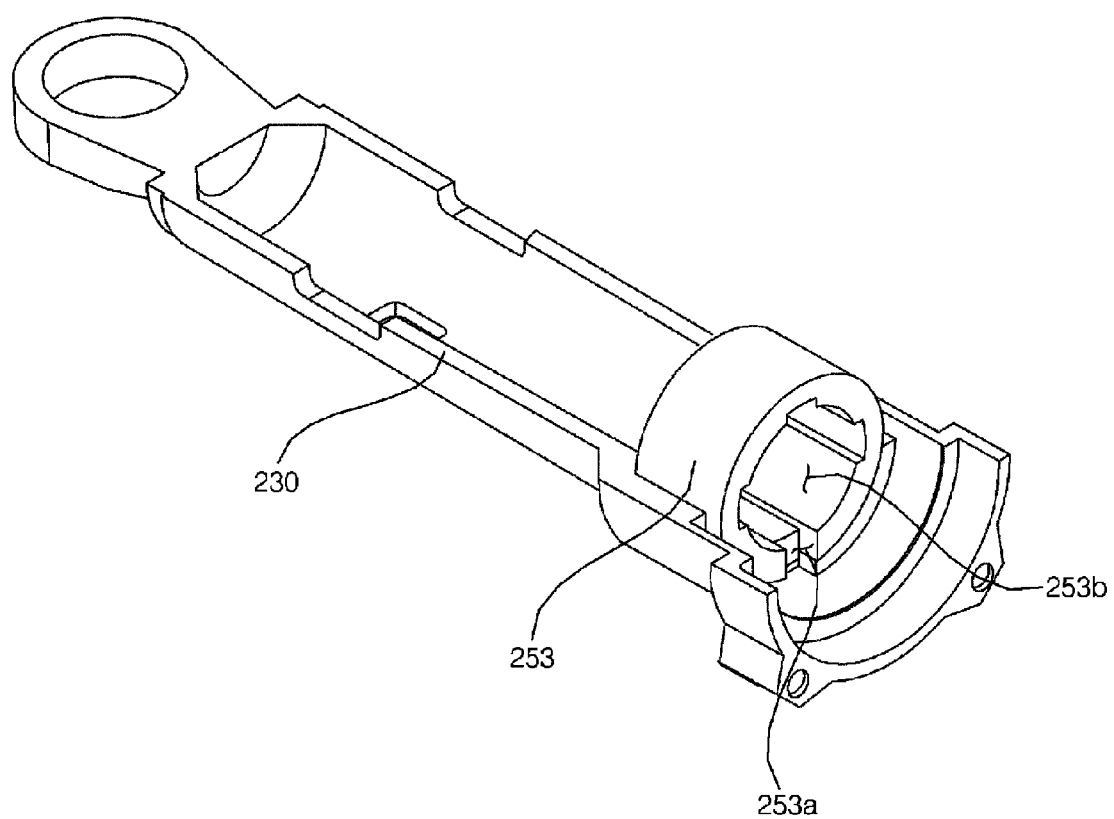
FIG. 14 shows a piston support disposed in the cylinder.
Figure 15:
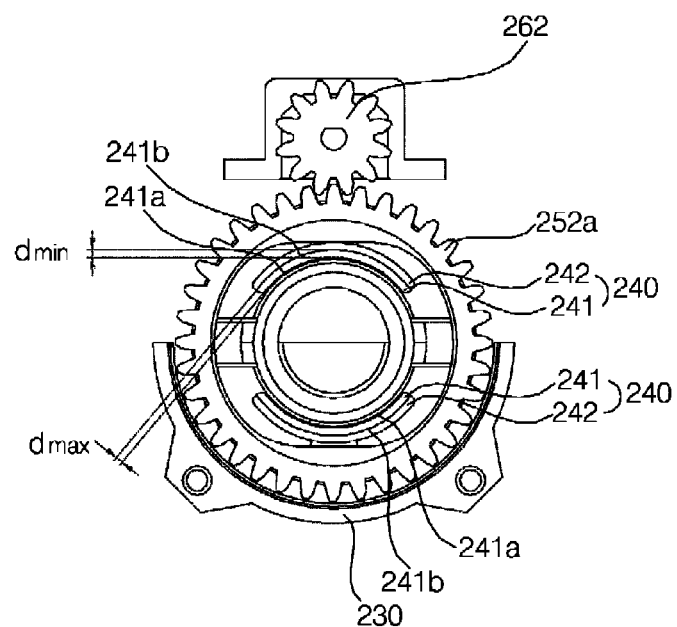
FIG. 15 is a view illustrating operation of the shock absorber, which is at a first operational position.
Figure 16:
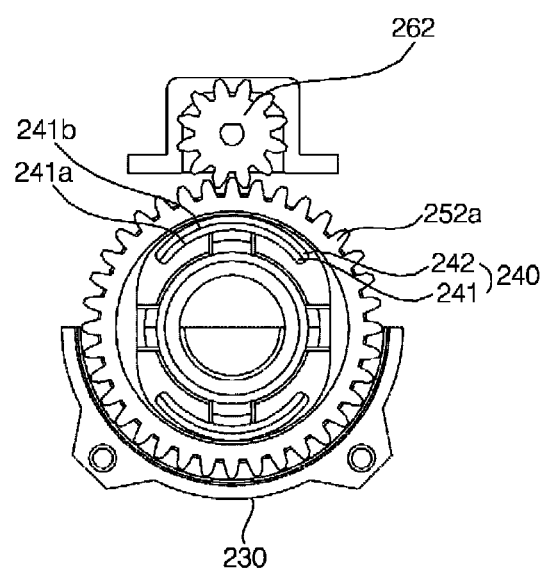
FIG. 16 is a view illustrating operation of the shock absorber, which is at a second operational position.
Figure 17:
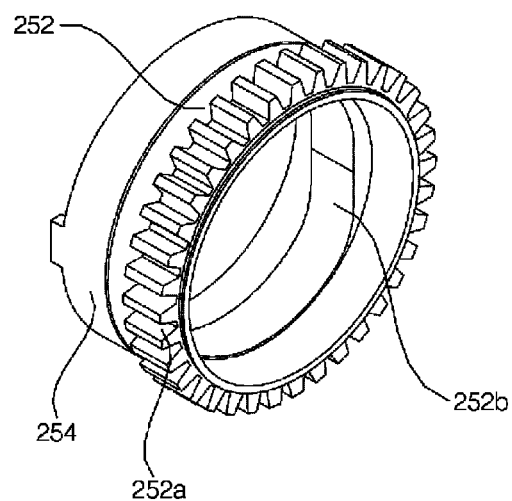
FIG. 17 is a perspective view showing a holder operating member.
Figure 18:
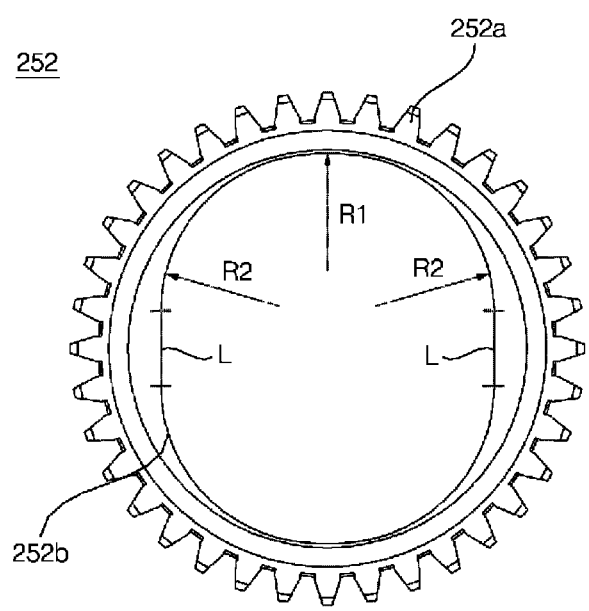
FIG. 18 is a view showing a cam forming portion formed in the holder operating member.

FIG. 12 is a perspective view showing a shock absorber 200 according to another embodiment of the present invention. FIG. 13 is a cutaway view showing shock absorber 200 of FIG. 12. FIG. 14 shows a piston support disposed in the cylinder. FIG. 15 is a view illustrating operation of shock absorber 200, which is at a first operational position. FIG. 16 is a view illustrating operation of shock absorber 200, which is at a second operational position. FIG. 17 is a perspective view showing a holder operating member. FIG. 18 is a view showing a cam forming portion formed in the holder operating member.

Referring to FIGS. 12 to 18, shock absorber 200 includes a cylinder 230, a piston 220, a friction member 241, friction member holders 242, and a holder operating member 252.

Piston 220 is connected to one of casing 11 and outer tub 22 to move according to vibration of outer tub 22, and cylinder 230 is connected to the other one of casing 11 and outer tub 22. When outer tub 22 vibrates, piston 220 and cylinder 230 make relative movement with respect to each other. In this embodiment, cylinder 230 is connected to outer tub 22 and is moved according to vibration of outer tub 22. In another embodiment, cylinder 230 may be connected to casing 11 and fixed. Shock absorber 200 may be provided with a piston connection portion 211 to connect piston 220 to casing 11, and a cylinder connection portion 212 to connect cylinder 230 to outer tub 22.

Friction member 241 is provided to allow friction to occur between friction member 241 and piston 220. Depending on the operating position of holder operating member 252, which will be described later, friction member holders 242 move to cause friction member 241 to contact piston 220 such that predetermined friction occurs between friction member 241 and piston 220.

Friction member 241 may be formed of a deformable material, which is deformed when external force is applied thereto, and returns to an original shape when the external force is removed. For example, friction member 241 may be formed of rubber or felt. Friction member 241 may be disposed between friction member holders 242 and piston 220, or may be fixed to the inner lateral surfaces of friction member holders 242 to integrally move together with friction member holders 242.

When holder operating member 252 is at the first operational position (see FIG. 15), holder operating member 252 applies pressure to friction member holders 242, causing friction member 241 to contact piston 220. When holder operating member 252 is at the second operational position (see FIG. 16), it releases pressure applied to friction member holders 242 to allow friction member 241 to be separated from piston 220. Herein, the pressure applied to friction member holders 242 is defined as pressure to push friction member holders 242 toward piston 220.

In some embodiments, holder operating member 252 positioned at the second operational position may apply force to friction member holder 242 in a direction opposite to the direction of force holder operating member 252 applies when it is at the first operational position. However, even in this case, it will be understood that holder operating member 252 releases pressure to push friction member holder 242 toward piston 220 when it is at the second operational position.

Holder operating member 252 is rotatably disposed in cylinder 230, and piston 220 is inserted into holder operating member 252. Defined between holder operating member 252 and piston 220 is a predetermined space allowing friction member holder 242 to move therein. Holder operating member 252 includes an annular cam forming portion 252b protruding from the inner circumferential surface facing friction member holder 242 and extending along a circumferential direction.

Meanwhile, shock absorber 200 may further include a shock absorption control motor 260. Shock absorption control motor 260 provides a driving force to rotate holder operating member 252. For example, shock absorption control motor 173 may include a DC motor which produces a torque between about 300 g·cm and 2,500 g·cm. A fixing member 215 to fix shock absorption control motor 260 to the cylinder 230 may further be provided.

Shock absorber 200 may include at least one gear to transfer driving force of shock absorption control motor 260 to holder operating member 252 to allow rotation of holder operating member 252. The at least one gear may include a driving gear 262 rotated by shock absorption control motor 260, and a driven gear 252a formed along the outer circumferential surface of holder operating member 252 to rotate in response to rotation of driving gear 262.

The gear ratio between driving gear 262 and driven gear 252a may be 3:1. This means that driven gear 252a completes one revolution per three revolutions of driving gear 262. In one embodiment, driving gear 262 rotates at the same rotational speed (rpm) as that of shock absorption control motor 260, and driven gear 252a rotates at the same rotational speed (rpm) as that of holder operating member 252. In some embodiments, however, a power transmission means such as a gear may be provided between driving gear 262 and driven gear 252a.

Meanwhile, =shock absorber 200 may further include a piston support 253 fixed to an inner side of =cylinder 230 to support the piston 220 by causing the inner lateral surface of the piston support to contact piston 220. A movement groove 253a may be formed along the inner lateral surface 253b of piston support 253, which closely contacts the outer circumferential surface of piston 220, in a radial direction. Friction member holder 242 may be provided with a protrusion 242c movably inserted into movement groove 253a.

Meanwhile, one end of cylinder 230 needs to be open wide enough to allow friction member 241 and friction member holder 242 to be easily inserted into cylinder 230. A cylinder cap 213 may be coupled to the open end. An insertion hole is formed at the center of cylinder cap 213 to allow insertion of piston 220.

FIG. 13 shows a protrusion 243c formed at a lower end of friction member holder 242. In addition to protrusion 243c, the upper end of friction member holder 242 may also be provided with a protrusion (not shown). In this case, the protrusion formed at the upper end of friction member holder 242 may be adapted to move in movement groove 253a formed inside piston support 253, while protrusion 242c formed at the lower end of friction member holder 242 may be adapted to move in a movement groove 213a formed in cylinder cap 213.

Friction member holder 242 may be provided at symmetric positions in cylinder 230. That is, cylinder support 253 and cylinder cap 213 may be provided with a pair of movement grooves 253a and 213a.

Meanwhile, holder operating member 252 and piston support 253 may be formed of different materials. To reinforce driven gear 252a, holder operating member 252 may be formed of a metallic material. In the case that piston support 253 is formed through injection molding of a synthetic resin, shock absorption portion 254 formed of a synthetic material may be disposed between holder operating member 252 and piston support 253 such that holder operating member 252 does not directly contact piston support 253. Shock absorption portion 254 may integrally rotate with holder operating member 252.

Referring to FIG. 18, a cam forming portion 252b includes a pressing section L to apply pressure to friction member holder 242 when holder operating member 252 is at the first operational position, and a spacing section D to maintain a predetermined distance from cylinder 230 such that friction member 241 can be separated from cylinder 230, i.e., such that friction member holder 242 can move along movement grooves 253a and 213a when holder operating member 252 is at the second operational position. The spacing section D may be formed as a circular arc with a predetermined radius of curvature R1, while the pressing section L may be formed as a straight line. A connection section C having a radius of curvature R2 greater than the radius of curvature R1 of the spacing section D may be formed between the pressing section L and the spacing section D.

Particularly, in the case that the pressing section L is formed as a straight line rather than as a circular arc, when holder operating member 252 is controlled to move to the first operational position, relatively uniform pressure having similar magnitude to that of the pressure applied at the right position is applied to friction member holder 242 even if holder operating member 252 is not moved to cause the center of the pressing section L to coincide with the center of friction member holder 242.

Referring to FIG. 15, when holder operating member 252 is at the first operational position, cam forming portion 252b applies pressure to cause friction member 241 to closely contact piston 220. Accordingly, as friction member 241 is compressed, it closely contacts piston 220. At this time, the minimum distance $d_{min}$ between the center of the inner lateral surface of friction member holder 242 and piston 220 is formed. Preferably, the minimum distance is smaller than the thickness of friction member 241 when external force is not applied. On the other hand, a maximum distance $d_{max}$ is preferably formed between the edge of the inner lateral surface of friction member holder 242 and piston 220. To accomplish this, in one embodiment, the radius of curvature of the inner lateral surface of friction member holder 242 is larger than the radius of curvature of the outer circumferential surface of piston 220. In this configuration, when the pressing section L of cam forming portion 252b moves onto the lateral end of friction member holder 242 during movement of holder operating member 252 to the first operational position, the lateral end of friction member 241 can be prevented from being strongly pressed against cylinder 230, even if pressure is not yet applied to the center of friction member holder 242, i.e., even if holder operating member 252 is not yet positioned at the first operational position.

Referring to FIG. 16, when holder operating member 252 is controlled to move to the second operational position, the spacing section D is placed at the position corresponding to that of friction member holder 242. At this time, a space allowing friction member holder 242 separated from piston 220 to move is secured between the spacing section D and piston 220. When switching from the first operational position to the second operational position is performed, friction member 241 compressed at the first operational position is elastically separated from piston 220 by its own resilience. Even if friction member 241 is not separated from piston 220 but in contact with piston 220, friction member holder 242 is allowed to freely move along movement grooves 253a and 213a at the second operational position, and accordingly the friction between friction member 241 and piston 220 is trivial.

In this embodiment, the operational position of holder operating member 252 can be controlled according to the amount of vibration of outer tub 22. Regarding control of vibration of an object exhibiting a periodic movement, it is widely known that vibrational energy of the object in a vibration range in which the amount of vibration is large needs to be absorbed by damping the vibration, and a degree of freedom of the object to maintain the steady state is preferably secured when the movement of the object reaches the steady state and the amount of vibration is within an allowed range. The first operational position is a position at which operation of holder operating member 252 is controlled to damp the vibration of outer tub 22 in the case that vibration of outer tub 22 increases to a large extent. The vibration is damped by friction acting between friction member 241 and piston 220.

The second operational position is a position at which operation of holder operating member 252 is controlled to allow cylinder 230 to freely reciprocate without frictional action between friction member 241 and piston 220. At the second operational position, cylinder 230 and piston 220 move relatively freely with respect to each other. Therefore, the amount of vibration transferred to casing 11 or the floor via cylinder 230 or piston 220 may be reduced. This is particularly effective in reducing noise when stability of the entire system is secured, as in the steady state, against vibration.

Figure 19:
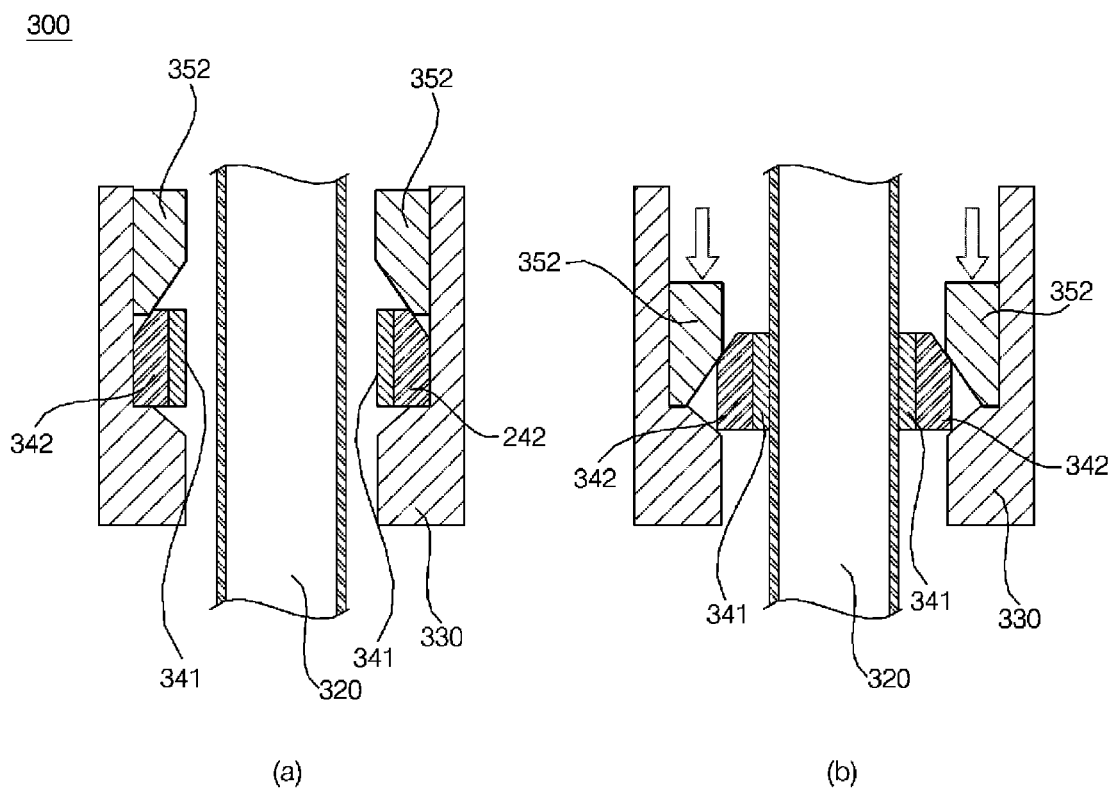
FIGS. 19(a) and 19(b) are views showing a shock absorber according to yet another embodiment, wherein a holder operating member is at the second operational position (FIG. 19(a)) or at the first operational position (FIG. 19(b))

FIG. 19 is a view showing a shock absorber 300 according to another embodiment of the present invention, a holder operating member 352 shown at the second operational position (FIG. 19(a)) and shown at the first operational position (FIG. 19(b)). Referring to FIG. 19, holder operating member 352 of shock absorber 300 moves between the first operational position (see FIG. 19(b)) and the second operational position (see FIG. 19(a)) along the longitudinal direction of cylinder 330. When holder operating member 352 moves to the first operational position, a friction member holder 342 moves toward piston 230. That is, holder operating member 352 moves in a direction perpendicular to the movement of friction member holder 342. Ends of holder operating member 352 and friction member holder 342 may be provided with inclined surfaces contacting each other. In this case, the direction of action of force is changed by the inclined surfaces. Meanwhile, in one embodiment, shock absorber 300 may include a linear motor to cause holder operating member 352 to rectilinearly move, as a shock absorption motor.

Figure 20:
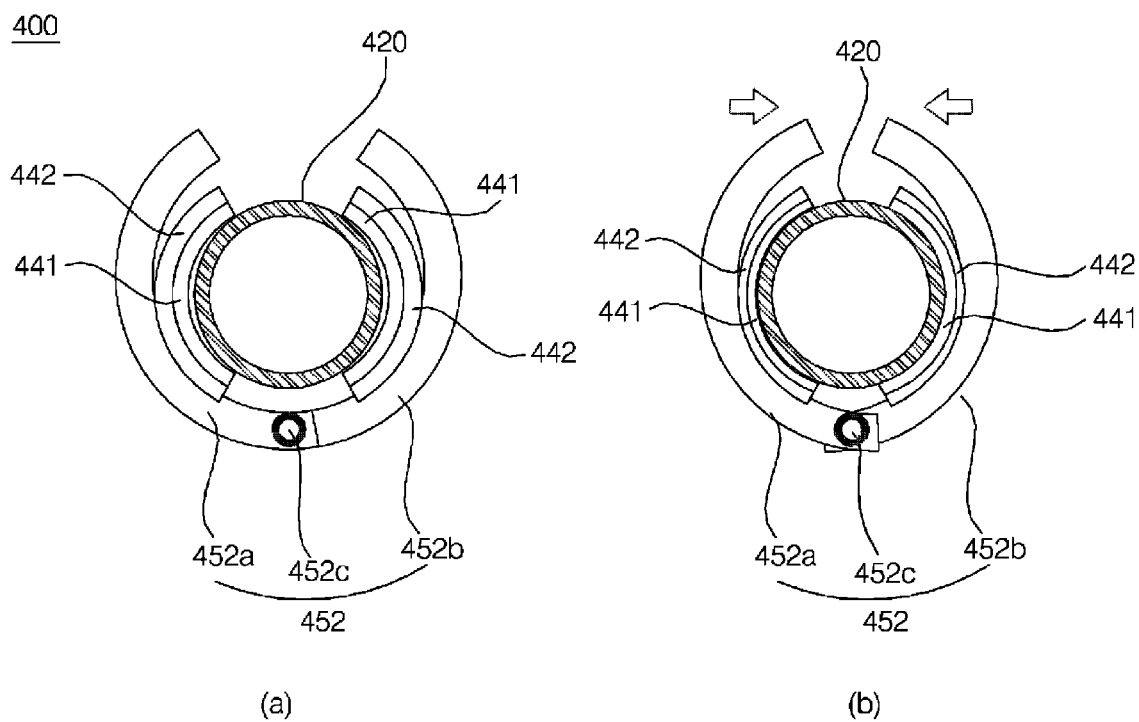
FIGS. 20(a) and 20(b) are views showing a shock absorber according to still another embodiment, wherein a holder operating member is at the second operational position (FIG. 20(a)) or at the first operational position (FIG. 20(b)).

FIG. 20 is a view showing a shock absorber according to yet another embodiment of the invention, a holder operating member 452 shown at the second operational position (FIG. 20(a)) and shown at the first operational position (FIG. 20(b)). Referring to FIG. 20, holder operating member 452 of shock absorber 400 includes a pair of operating arms 452a and 452b pivotably disposed in cylinder 330. Herein, the first operational position of holder operating member 452 may be defined as a position at which the distance between operating arms 452a and 452b is minimized, and the second operational position may defined as a position at which the distance between operating arms 452*a* and 452*b* is maximized. Operating arms 452*a* and 452*b* may rotate about a hinge shaft 452*c*.

At the first operational position, friction member holder 442 is pressed by operating arms 452*a* and 452*b*. Thereby, friction member 441 closely contacts piston 420. At the second operational position, pressure applied to friction member holder 442 is released, and thus friction member 441 is separated from piston 420.

Meanwhile, referring to FIG. 9, when the level of vibration of outer tub 22 becomes equal to or higher than a certain level during rotation of inner tub 24, holder operating member 252, 352, 452 is moved to the first operational position such that vibration is absorbed by friction action between friction member 241, 341, 441 and piston 220, 320, 420. On the other hand, in the case that the level of vibration of outer tub 22 is less than a certain level, holder operating member 252, 352, 452 is controlled to moved to the second rotational position to allow friction member 241, 341, 441 to move relatively freely. At this time, the operational positions of holder operating member 252, 352, 452 may be switched though control of shock absorption control motor 173 by controller 172.

In some embodiments, a vibration sensing unit (not shown) to measure the amount of vibration of outer tub 22 may be further provided. For example, the vibration sensing unit may be realized as an output sensor to sense change in output power of driving unit 13 according to rotation of inner tub 24, or as a displacement sensor to measure displacement of outer tub 22 according to vibration. In addition, in some embodiments, a speed detection unit 171 to detect change in rotational speed of inner tub 24 may be further provided. Controller 172 controls operation of shock absorption control motor 173 according to the rotational speed detected by speed detection unit 171 to control operational positions of holder operating member 252, 352, 452.

The laundry processing machine generally exhibits a certain pattern of vibration, which is somewhat predictable, according to the rotational speed of inner tub 24. For example, resonance is produced in outer tub 22 in a specific range of rotational speed depending on the natural frequency of outer tub 22. When such a range is defined as a resonant speed section, laundry distribution operation or maldistribution removing operation of rotating inner tub 24 in a certain pattern is performed in a predetermined range of rotational speed away from the resonant speed section to distribute the laundry accommodated in inner tub 24 or to remove maldistribution of the laundry in inner tub 24. When distribution of the laundry in inner tub 24 becomes uniform to a certain extent through such operation, the rotational speed of inner tub 24 is increased to perform the drying operation. In one embodiment, the operational positions of holder operating member 252, 352, 452 may be controlled, with reference to a preset speed (about 400 rpm) equal to or higher than the resonant speed. That is, in the range of rotational speed of inner tub 24 which is lower than the preset speed, holder operating member 252, 352, 452 is controlled to move to the first operational position to damp the vibration. In the range of rotational speed of inner tub higher than the preset speed, holder operating member 252, 352, 452 may be controlled to move to the second operational position.

The laundry processing machine of the present disclosure is capable of performing proper shock absorption or vibration attenuation according to the characteristics of vibration of the outer tub. Therefore, the system can be stabilized in a shorter time.

In addition, the laundry processing machine of the present disclosure is capable of actively varying the capacity of shock absorption according to the characteristics of vibration of the outer tub. Therefore, the time taken prior to start of the drying operation can be reduced.

In addition, the laundry processing machine of the present disclosure can provide a larger capacity of shock absorption in the vibration section in which the outer tub greatly vibrates, thereby actively damping the vibration of the outer tub. Thereby, even if the space between the casing and the outer tub is narrow, collision between the outer tub and the casing can be prevented. Therefore, a larger volume of the outer tub can be secured for the inner space of the casing, which is limited to have a certain size.

In addition, the laundry processing machine of the present disclosure can reduce the amount of vibration transferred to the casing in the steady state, thereby reducing noised produced by the vibration.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. A laundry processing machine comprising:
   a casing;
   an outer tub supported in the casing;
   an inner tub rotatably provided in the outer tub; and
   a shock absorber coupled, at one end thereof, to the casing and coupled, at an other end thereof, to the outer tub to absorb vibration of the outer tub caused by rotation of the inner tub,
   wherein the shock absorber actively provides a damping force in response to the vibration of the outer tub,
   wherein the shock absorber further comprises:
      a cylinder;
      a piston,
         wherein the cylinder and the piston make a relative movement with respect to each other according to the vibration of the outer tub;
      a slide member arranged to slide along the piston; and
      a slide member guide interposed between the cylinder and the slide member to be rotatable between a first rotational position and a second rotational position, and being moved together with the cylinder,
      wherein a displacement of the slide member guide with respect to the slide member, which is caused by the relative movement of the cylinder with respect to the piston, is allowed to a greater extent when the slide member guide is at the second rotational position than at the first rotational position, and
      wherein the damping force is caused by a friction between the slide member and the piston when the slide member is moved by the slider member guide during the relative movement of the cylinder with respect to the piston.

2. The laundry processing machine of claim 1, wherein a maximum allowable displacement of the slide member guide with respect to the slide member increases when the slide member guide rotates from the first rotational position to the second rotational position.

3. The laundry processing machine of claim 1, wherein:
the slide member comprises a protrusion protruding from an outer circumferential surface of the slide member;
the slide member guide comprises an open-cut portion extending along a circumferential direction of the slide member guide to allow the protrusion to be disposed through the open-cut portion; and
the open-cut portion comprises first and second boundaries formed at both sides of the protrusion such that the first boundary moves the protrusion in one direction and the second boundary moves the protrusion in an opposite direction according to the vibration of the outer tub,
wherein a distance between the first boundary and the second boundary varies along a circumferential direction.

4. The laundry processing machine of claim 3, wherein a relative displacement of the slide member guide with respect to the protrusion is restricted by the distance between the first boundary and the second boundary.

5. The laundry processing machine of claim 3, wherein the cylinder comprises a movement groove allowing the protrusion to be movably inserted therein and adapted to allow rectilinear movement of the protrusion according to the vibration of the outer tub and to restrict rotational movement of the protrusion.

6. The laundry processing machine of claim 5, wherein the cylinder comprises a restriction surface to restrict movement of the protrusion by contacting a longitudinal end of the slide member before the protrusion reaches a longitudinal end of the movement groove.

7. The laundry processing machine of claim 6, wherein the slide member is provided with a depression at a portion thereof contacting the restriction surface.

8. The laundry processing machine of claim 3, wherein the protrusion is restricted between the first boundary and the second boundary when the slide member guide is at the first rotational position.

9. The laundry processing machine of claim 1, wherein the shock absorber further comprises a shock absorption control motor to provide a driving force, wherein the slide member guide is rotated by the shock absorption control motor.

10. The laundry processing machine of claim 9, further comprising:
at least one gear to transfer the driving force of the shock absorption control motor such that the slide member guide is rotated.

11. The laundry processing machine of claim 10, wherein the at least one gear comprises:
a driving gear rotated by the shock absorption control motor; and
a driven gear formed along an outer circumferential surface of the slide member guide to rotate in response to rotation of the driving gear,
wherein a gear ratio between the driving gear and the driven gear is 2:1.

12. The laundry processing machine of claim 9, wherein the shock absorption control motor is driven according to a rotational speed of the inner tub.

13. The laundry processing machine of claim 3, wherein the slide member comprises a frictional contact surface partially protruding along the outer circumferential surface of the slide member to contact an inner circumferential surface of the slide member guide.

14. The laundry processing machine of claim 13, wherein the first boundary and the second boundary are positioned on the frictional contact surface.

15. The laundry processing machine of claim 3, wherein a protrusion insert path allowing the protrusion to be inserted therein is formed at a longitudinal end of the slide member guide such that the slide member is installed inside the slide member guide.

16. The laundry processing machine of claim 15, wherein one boundary of the protrusion insert path is connected to the first boundary such that a slope of a surface of the one boundary continuously changes.

17. The laundry processing machine of claim 1, wherein the slide member guide is rotated to one of the first rotational position and the second rotational position according to a rotational speed of the inner tub.

18. The laundry processing machine of claim 17, wherein the slide member guide moves from the first rotational position to the second rotational position when the rotational speed of the inner tub is equal to or higher than a predetermined speed.

19. The laundry processing machine of claim 18, wherein the predetermined speed is equal to or higher than a resonant speed of the inner tub.

20. The laundry processing machine of claim 19, wherein the predetermined speed of the inner tub is 400 rpm.

21. The laundry processing machine of claim 17, wherein the slide member guide moves from the first rotational position to the second rotational position according to an amount of vibration of the outer tub.

22. The laundry processing machine of claim 21, further comprising:
a vibration sensor to sense the amount of vibration of the outer tub.

23. The laundry processing machine of claim 1, wherein the slide member guide is formed of polytetrafluoroethylene.

24. The laundry processing machine of claim 1, wherein the cylinder comprises at least one support surface partially protruding from an inner circumferential surface of the cylinder to support the slide member guide by making surface contact with the slide member guide.

25. The laundry processing machine of claim 24, wherein the at least one support surface comprises a first support surface and a second support surface, the first support surface and the second support surface being spaced apart from each other,
wherein when the slide member guide is between the first support surface and the second support surface, the slide member guide is spaced apart from the cylinder.

26. A laundry processing machine comprising:
a casing;
an outer tub supported in the casing;
an inner tub rotatably provided in the outer tub; and
a shock absorber coupled, at one end thereof, to the casing and coupled, at an other end thereof, to the outer tub to absorb vibration of the outer tub caused by rotation of the inner tub,
wherein the shock absorber actively provides a damping force in response to the vibration of the outer tub, and
wherein the shock absorber further comprises:
a cylinder;
a piston,
wherein the cylinder and the piston make a relative movement with respect to each other according to the vibration of the outer tub;

a slide member arranged to slide along the piston; and a slide member guide interposed between the cylinder and the slide member to be rotatable between a first rotational position and a second rotational position, and being moved together with the cylinder, wherein, a displacement of the slide member guide with respect to the slide member, which is caused by the relative movement of the cylinder with respect to the piston, is allowed to a greater extent when the slide member guide is at the second rotational position than at the first rotational position, and wherein:

the slide member comprises a protrusion protruding from an outer circumferential surface of the slide member;

the slide member guide comprises an open-cut portion extending along a circumferential direction of the slide member guide to allow the protrusion to be disposed through the open-cut portion; and the open-cut portion comprises first and second boundaries formed at both sides of the protrusion such that the first boundary moves the protrusion in one direction and the second boundary moves the protrusion in an opposite direction according to the vibration of the outer tub, wherein a distance between the first boundary and the second boundary varies along a circumferential direction, and wherein the cylinder comprises a movement groove allowing the protrusion to be movably inserted therein and adapted to allow rectilinear movement of the protrusion according to the vibration of the outer tub and to restrict rotational movement of the protrusion.

27. The laundry processing machine of claim 26, wherein the cylinder comprises a restriction surface to restrict movement of the protrusion by contacting a longitudinal end of the slide member before the protrusion reaches a longitudinal end of the movement groove.

28. The laundry processing machine of claim 27, wherein the slide member is provided with a depression at a portion thereof contacting the restriction surface.

29. A laundry processing machine comprising:

a casing;

an outer tub supported in the casing;

an inner tub rotatably provided in the outer tub; and a shock absorber coupled, at one end thereof, to the casing and coupled, at an other end thereof, to the outer tub to absorb vibration of the outer tub caused by rotation of the inner tub, wherein the shock absorber actively provides a damping force in response to the vibration of the outer tub, and wherein the shock absorber further comprises:

a cylinder;

a piston, wherein the cylinder and the piston make relative movement with respect to each other according to the vibration of the outer tub;

a slide member arranged to slide along the piston; and a slide member guide interposed between the cylinder and the slide member to be rotatable between a first rotational position and a second rotational position, and being moved together with the cylinder, wherein, a displacement of the slide member guide with respect to the slide member, which is caused by the relative movement of the cylinder with respect to the piston, is allowed to a greater extent when the slide member guide is at the second rotational position than at the first rotational position, and wherein the cylinder comprises at least one support surface partially protruding from an inner circumferential surface of the cylinder to support the slide member guide by making surface contact with the slide member guide.

30. The laundry processing machine of claim 29, wherein the at least one support surface comprises a first support surface and a second support surface, the first support surface and the second support surface being spaced apart from each other, wherein when the slide member guide is between the first support surface and the second support surface, the slide member guide is spaced apart from the cylinder.

* * * * *